(12) United States Patent
Kairiku et al.

(10) Patent No.: US 8,235,696 B2
(45) Date of Patent: Aug. 7, 2012

(54) IN-MOLD FORMING APPARATUS, IN-MOLD FORMING METHOD, IN-MOLD FORMED ARTICLE MANUFACTURING METHOD, AND DUST COLLECTOR

(75) Inventors: Yoshinori Kairiku, Kanagawa-ken (JP); Noboru Koike, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 1120 days.

(21) Appl. No.: 11/251,826

(22) Filed: Oct. 18, 2005

(65) Prior Publication Data

US 2006/0082019 A1 Apr. 20, 2006

(30) Foreign Application Priority Data

Oct. 20, 2004 (JP) ................. 2004-306161

(51) Int. Cl.
*B29C 35/12* (2006.01)
(52) U.S. Cl. ................. 425/174.8 R; 425/174
(58) Field of Classification Search ............... 425/174.8, 425/174.8 R; 264/259, 328.1; 34/250
See application file for complete search history.

(56) References Cited

U.S. PATENT DOCUMENTS

| | | | |
|---|---|---|---|
| 5,000,903 A * | 3/1991 | Matzinger et al. ............ | 264/511 |
| 6,156,411 A | 12/2000 | Jennings | |
| 6,205,676 B1 * | 3/2001 | Fujii et al. ...................... | 34/250 |

FOREIGN PATENT DOCUMENTS

| | | |
|---|---|---|
| EP | 0 840 357 A2 | 5/1998 |
| JP | 7-329112 | 12/1995 |
| JP | 2000-108158 | 4/2000 |

OTHER PUBLICATIONS

Patent Abstracts of Japan, JP 07-329112, Dec. 19, 1995 (reference previously filed in Japanese language on Jan. 4, 2006).
Patent Abstracts of Japan, JP 2000-108158, Apr. 18, 2000 (reference previously filed in Japanese language on Jan. 4, 2006).

* cited by examiner

*Primary Examiner* — Larry Thrower
(74) *Attorney, Agent, or Firm* — Oblon, Spivak, McClelland, Maier & Neustadt, L.L.P.

(57) ABSTRACT

An in-mold forming apparatus including a first mold and a second mold for injection molding and a film feeding mechanism for feeding in-mold foil between the first mold and the second mold. A transfer foil is formed on the in-mold foil. The in-mold forming apparatus further includes a mold closing mechanism for closing the first mold and the second mold, thereby to fix the in-mold foil inside a cavity formed between the first mold and the second mold, a resin injection forming mechanism for injecting fused resin into the cavity, thereby to unit the transfer foil formed on the in-mold foil with the resin, and a charger arranged in the neighborhood of at least one of the first mold, the second mold, and the in-mold foil. The charger includes a charging unit for freeing ions and charging particles in the neighborhood of the in-mold foil, and an electrode for adsorbing the particles charged by the ions.

6 Claims, 10 Drawing Sheets

IN-MOLD FORMING APPARATUS, IN-MOLD FORMING METHOD, IN-MOLD FORMED ARTICLE MANUFACTURING METHOD, AND DUST COLLECTOR

CROSS-REFERENCE TO RELATED APPLICATIONS

This application is based upon and claims the benefit of priority from the prior Japanese Patent Application No. 2004-306161, filed on Oct. 20, 2004; the entire contents of which are incorporated herein by reference.

BACKGROUND OF THE INVENTION

1. Field of the Invention

The present invention relates to an in-mold forming apparatus, an in-mold forming method and an in-mold formed article manufacturing method, and more particularly relates to an in-mold forming apparatus, an in-mold forming method and an in-mold formed article manufacturing method for forming resin parts used for portable telephones, mobile information terminal devices, note-type personal computers, household electric appliances, car parts, and so on. Also, the present invention relates to a dust collector, and more particularly to a dust collector for efficiently collecting dust.

2. Description of the Background

Conventionally, resin is injection molded and simultaneously a pattern or characters are transferred to the surface of a formed article using in-mold foil, and thus an in-mold formed article is manufactured (for example, refer to Patent Documents 1 and 2). In-mold formed articles are widely used for portable telephones, note-type personal computers, mobile information terminal devices, household electric appliances, and car parts. Each in-mold formed article has an advantage that a high resolution image or design is transferred onto the outer surface thereof, thereby top coating is formed, and thus a firm transfer image can be formed.

FIG. 15 is a schematic view of an in-mold forming apparatus 10 for manufacturing such an in-mold formed article. The in-mold forming apparatus 10 is provided with a cavity-side block 11 fixed to the in-mold forming apparatus 10, a core-side block 12 arranged opposite to the cavity-side block 11 for moving in the left and right directions in the drawing, and a foil feeder 13 for feeding in-mold foil H. The cavity-side block 11 is provided with a cavity-side mold 11a, and the core-side block 12 is provided with a core-side mold 11b.

The foil feeder 13 is provided with a foil sender 13a for feeding the in-mold foil H and a foil winding machine 13b for winding a base film B which is made by separating a pattern from the in-mold foil H. The in-mold foil H is positioned in the neighborhood of the cavity-side mold 11a, and the interval between the in-mold foil H and the cavity-side mold 11a when both the molds 11a and 11b are opened is about 2 to 3 mm.

The in-mold foil H is composed of an adherent layer and a deposited layer which are laminated on the base film B via a separation layer, and a pattern layer is formed inside the adherent layer.

In the in-mold forming apparatus 10 formed like this, the in-mold foil H is pinched by the cavity-side mold 11a and the core-side mold 11b, and after both the molds 11a and 11b are closed, resin is injected into a cavity formed by the cavity-side mold 11a and the core-side mold 11b. As a result, in the in-mold foil H, the separation layer is separated from the base film B, and the separation layer side is formed integrally with a formed article.

Patent Document 1: Japanese Patent Disclosure (Kokai) Hei 7-329112
Patent Document 2: Japanese Patent Disclosure (Kokai) 2000-108158

The in-mold forming method aforementioned causes the following problem. Namely, after the forming is made, fine foil dusts P with a length of several microns to several mm may be separated and fallen from the in-mold foil H. When the foil dust P is adhered to a formed article or the cavity-side mold 11a and core-side mold 11b, at the next forming time, the foil dust P is transferred to the formed article as a dent. Further, when the dent is not found and the foil dust P is not wiped out, there is a fear of continuous manufacture of defective articles.

Particularly, in the display unit of the sub-liquid crystal panel of a portable telephone and so on, the parts are transparent, so that the failure rate due to the dent is high, and the yield rate of some part is low such as 50% to 60%, and thereby an increase in the manufacturing cost is caused.

On the other hand, an apparatus having a simple constitution for collecting fine dust with a length of several microns to several mm fallen on the floor is desired.

SUMMARY OF THE INVENTION

One object of the present invention is to provide an in-mold forming apparatus, an in-mold forming method, and an in-mold formed article manufacturing method for preventing an occurrence of defective articles, and efficiently transferring a high resolution pattern and design to the outer surface of each formed article at the time of the in-mold forming.

Further, another object of the present invention is to provide a dust collector for efficiently collecting fine dust.

One aspect of the invention is to provide an in-mold forming apparatus including a first mold and a second mold for injection molding and a film feeding mechanism for feeding in-mold foil between the first mold and the second mold. A transfer foil is formed on the in-mold foil. The in-mold forming apparatus further includes a mold closing mechanism for closing the first mold and the second mold, thereby to fix the in-mold foil inside a cavity formed between the first mold and the second mold, a resin injection forming mechanism for injecting fused resin into the cavity, thereby to unit the transfer foil formed on the in-mold foil with the resin, and a charger arranged in the neighborhood of at least one of the first mold, the second mold, and the in-mold foil. The charger includes a charging unit for freeing ions and charging particles in the neighborhood of the in-mold foil, and an electrode for adsorbing the particles charged by the ions.

One aspect of the invention is to provide an in-mold forming method including feeding in-mold foil between a first mold and a second mold for injection molding. A transfer foil is formed on the in-mold foil. The in-mold forming method further includes closing the first mold and the second mold, thereby to fix the in-mold foil inside a cavity formed between the first mold and the second mold, injecting fused resin into the cavity, thereby to unit the transfer foil formed on the in-mold foil with the resin, and freeing ions and charging particles in the neighborhood of the in-mold foil and adsorbing the particles charged by the ions.

One aspect of the invention is to provide an in-mold formed article manufacturing method including feeding in-mold foil between a first mold and a second mold for injection molding. The transfer foil is formed on the in-mold foil. The in-mold formed article manufacturing method further includes closing the first mold and the second mold, thereby to fix the in-mold foil inside a cavity formed between the first mold and the second mold, injecting fused resin into the cavity, thereby to form an in-mold formed article and to unit the transfer foil formed on the in-mold foil with the in-mold formed article, and freeing ions and charging particles in the neighborhood of the in-mold foil and adsorbing the particles charged by the ions.

One aspect of the invention is to provide a dust collector including a charging unit for freeing ions and charging particles, and an electrode for adsorbing the particles charged by the ions.

According to the present invention, an occurrence of defective articles is prevented and a high resolution pattern or design can be efficiently transferred to the outer surface of each formed article. Further, fine dust can be collected efficiently.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE INVENTION

Figure 1:
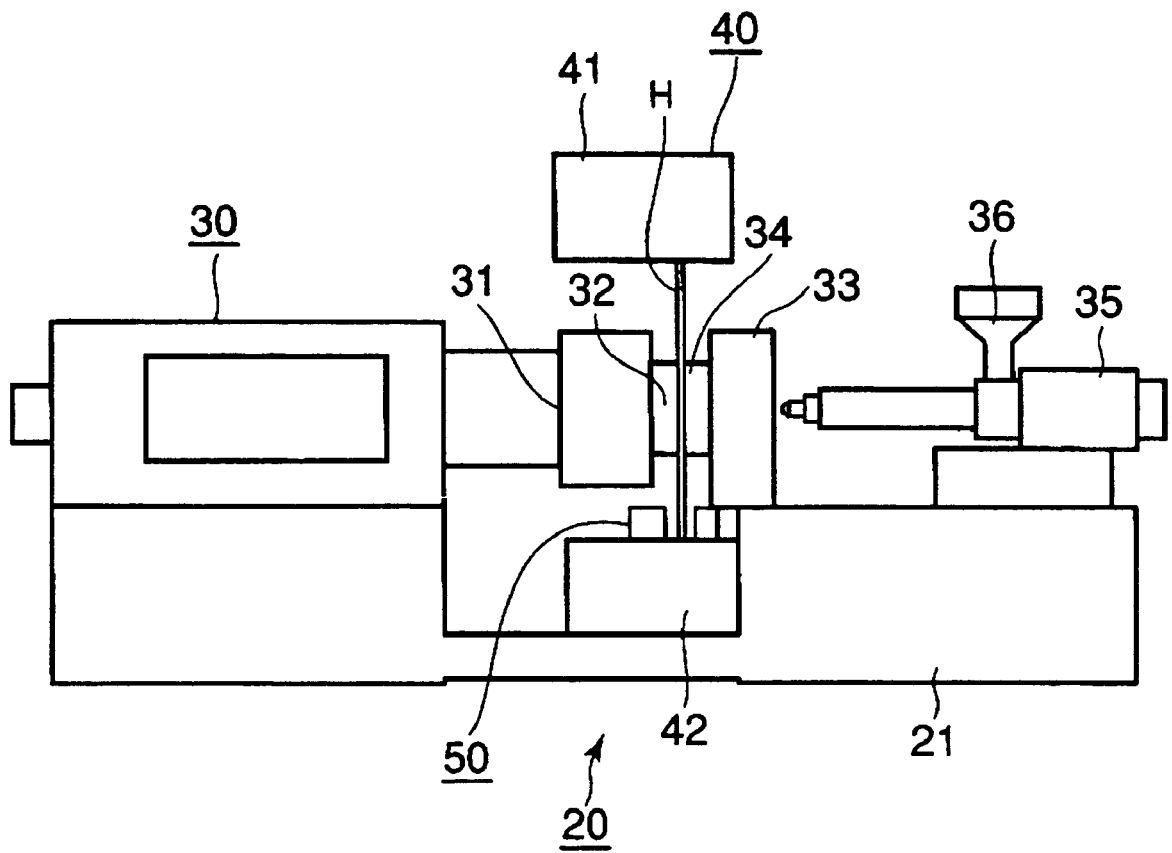
FIG. 1 is a front view showing an in-mold forming apparatus according to a first embodiment of the present invention.

Referring now to the drawings, wherein like reference numerals designate identical or corresponding parts throughout the several views, the embodiments of this invention will be described below.

First Embodiment

Figure 2:
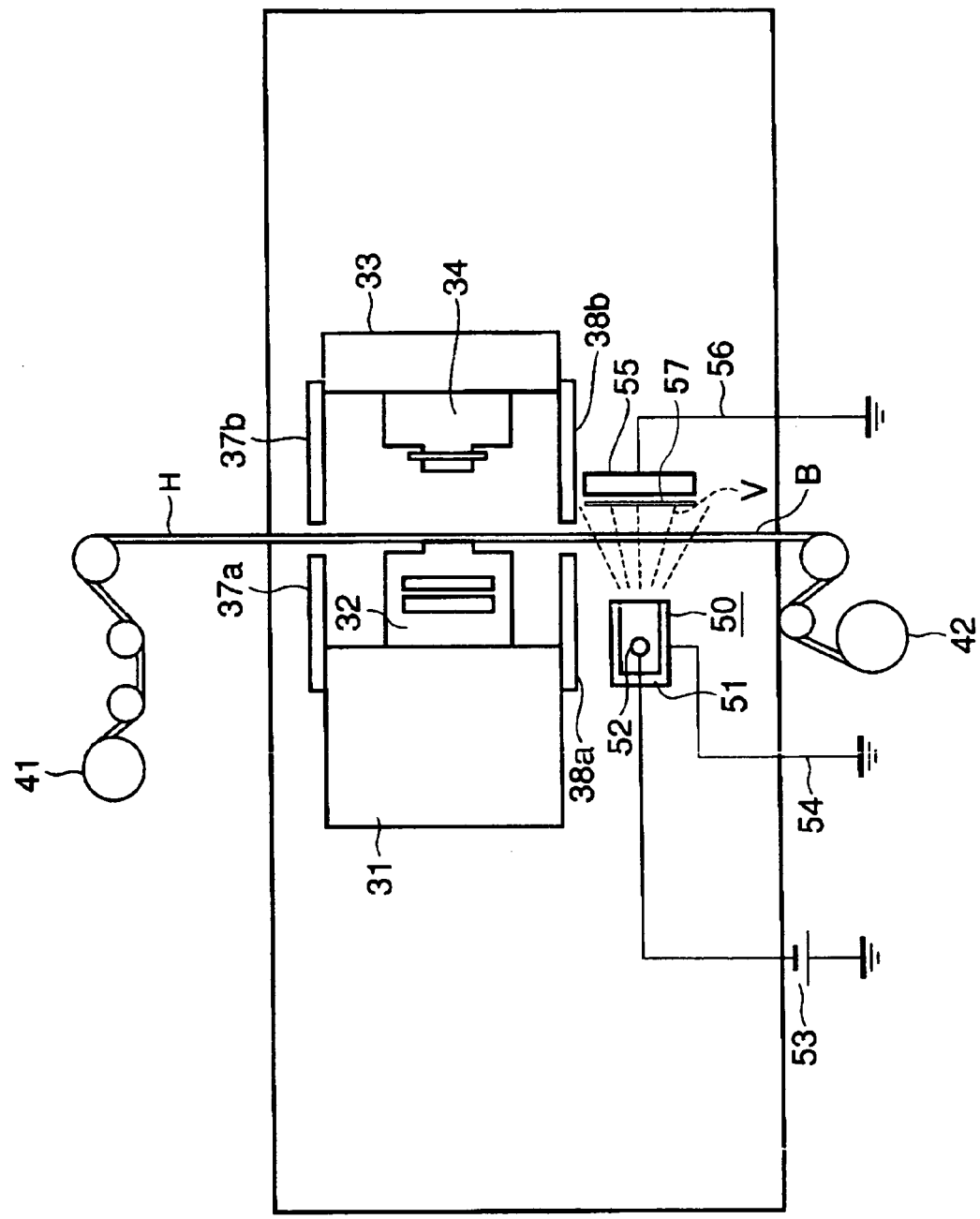
FIG. 2 is a schematic view showing an essential part of the in-mold forming apparatus shown in FIG. 1.
Figure 3:
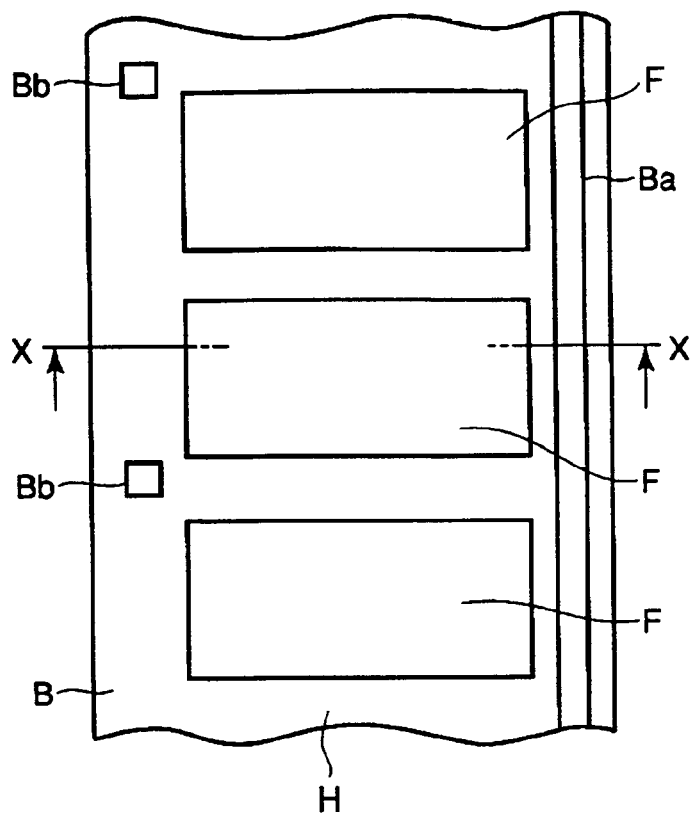
FIG. 3 is a front view showing an in-mold foil used in the in-mold forming apparatus shown in FIG. 1.
Figure 4:
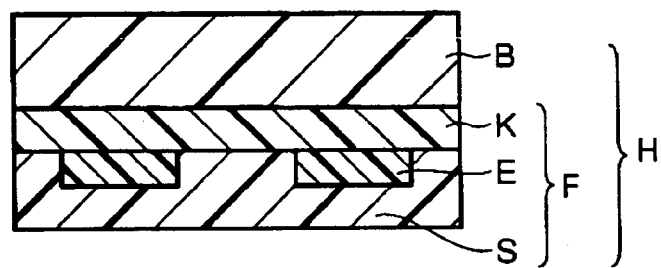
FIG. 4 is a cross sectional view showing an example of the in-mold foil cut off along a line X-X shown in FIG. 3 viewed in the direction of an arrow.
Figure 5:
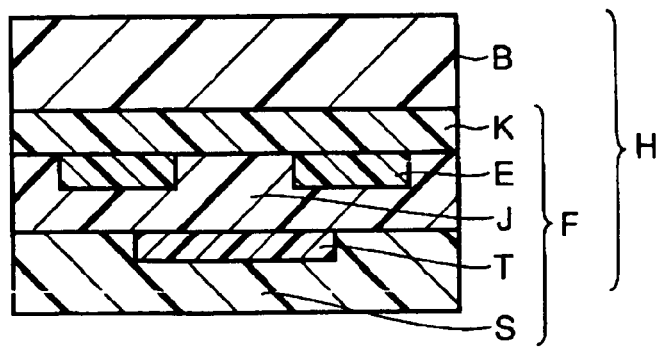
FIG. 5 is a cross sectional view showing another example of the in-mold foil cut off along the line X-X shown in FIG. 3 viewed in the direction of the arrow.
Figure 6:
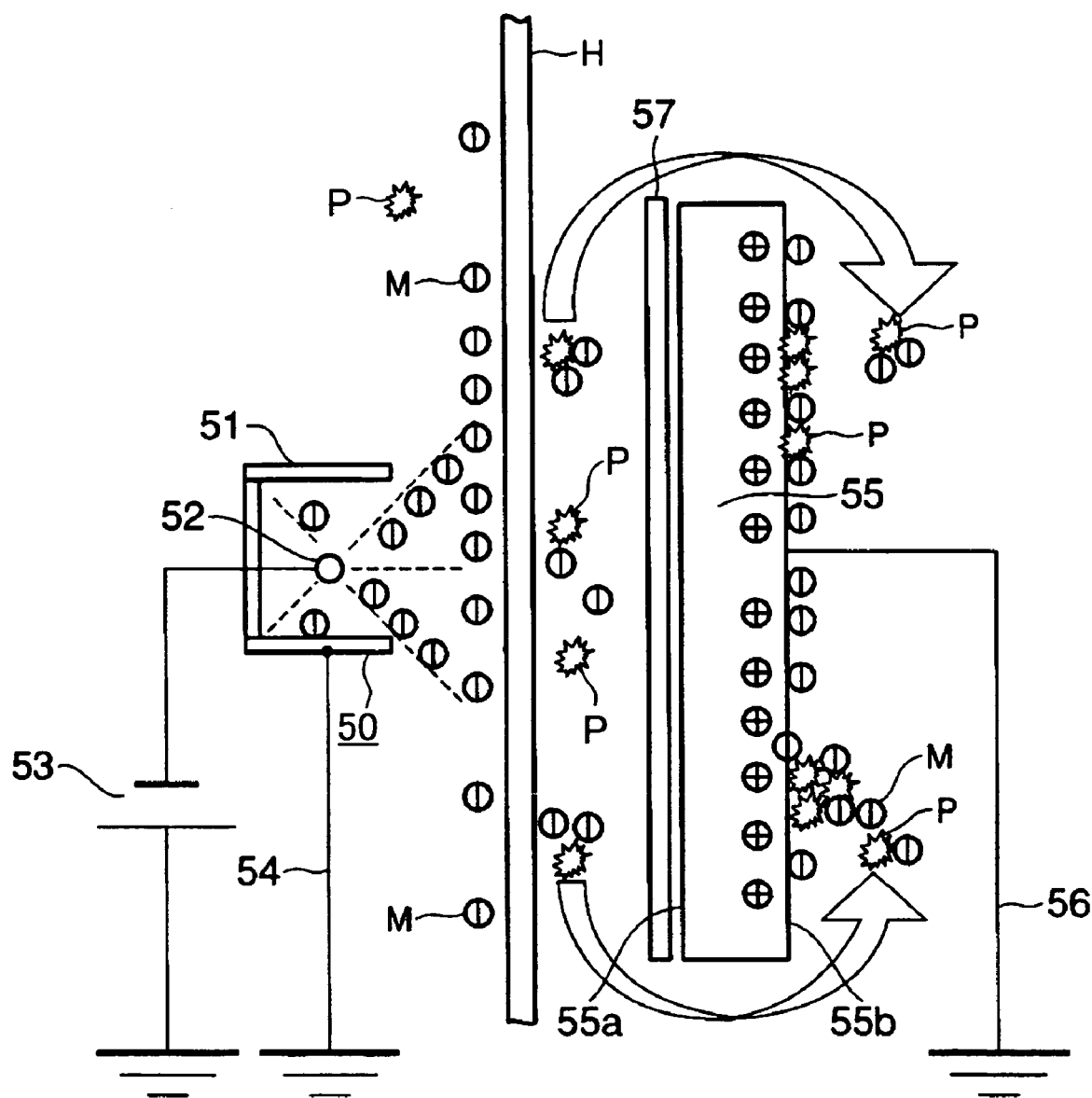
FIG. 6 is an illustration for showing an operation principle of the in-mold forming apparatus shown in FIG. 1.
Figure 7:
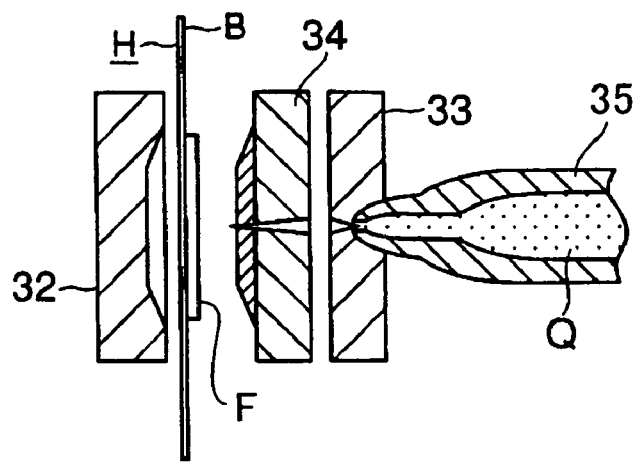
FIG. 7 is a cross sectional view showing an injection forming step by the in-mold forming apparatus shown in FIG. 1.
Figure 8:
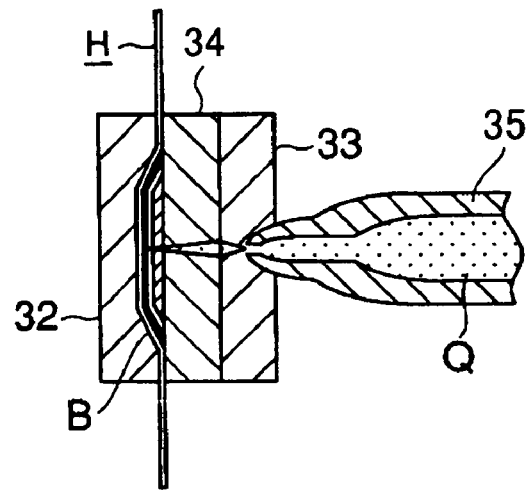
FIG. 8 is a cross sectional view showing an injection forming step by the in-mold forming apparatus shown in FIG. 1.
Figure 9:
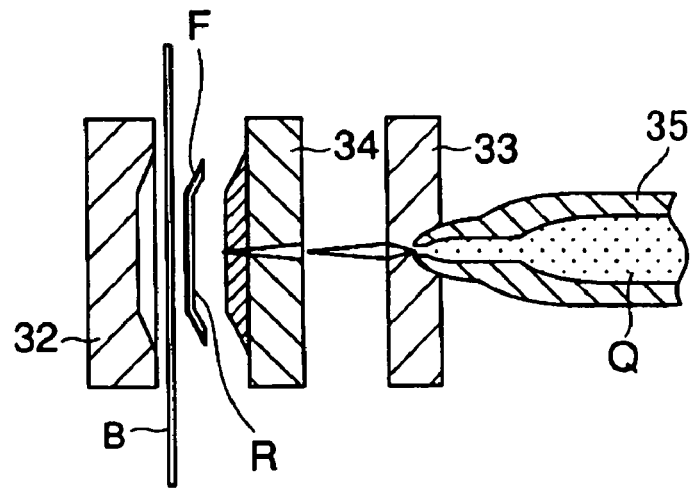
FIG. 9 is a cross sectional view showing an injection forming step by the in-mold forming apparatus shown in FIG. 1.

FIG. 1 is a front view showing an in-mold forming apparatus 20 according to a first embodiment of the present invention, FIG. 2 is a schematic view showing an essential part of the in-mold forming apparatus 20, and FIG. 3 is a front view showing an in-mold foil H used in the in-mold forming apparatus 20. FIGS. 4 and 5 are cross sectional views of the in-mold foil H cut off along a line X-X shown in FIG. 3 viewed in a direction of an arrow, respectively, and FIG. 6 is an illustration for showing an operation principle of the in-mold forming apparatus 20. FIGS. 7 to 9 are cross sectional views showing an injection forming step by the in-mold forming apparatus 20, respectively. Further, in these drawings, numeral H indicates the in-mold foil, B the base film, F a transfer foil, and P the foil dust.

As shown in FIG. 1, the in-mold forming apparatus 20 is provided with a frame 21 loaded on the floor, an injection forming mechanism 30 installed on the frame 21, an in-mold foil feeding mechanism 40 for feeding in-mold foil H, and a charger 50 for charging the in-mold foil H.

The injection forming mechanism 30 is provided with a cavity-side block 31 fixed to the frame 21, a cavity-side mold (first mold) 32 installed on the cavity-side block 31, a core-side block 33 arranged opposite to the cavity-side block 31 for moving in the left and right directions in the drawing, a core-side mold (second mold) 34 installed on the core-side block 33 which can be combined with the cavity-side mold 32, an injection molder 35 for injecting fused resin into a cavity formed between the cavity-side mold 32 and the core-side mold 34, and a resin feeder 36 for feeding resin to the injection molder 35. The core-side block 33 has a function for moving toward the cavity-side block 31 thereby to close the cavity-side mold 32 and core-side mold 34.

As shown in FIG. 2, the circumference of the cavity-side mold 32 and the core-side mold 34 is openably shielded by a pair of upper shielding plates 37a and 37b and a pair of lower shielding plates 38a and 38b. Further, the pair of upper shielding plates 37a and 37b and the pair of lower shielding plates 38a and 38b are arranged not so as to make contact with the cavity-side block 31 and core-side block 33 when opening or closing the cavity-side mold 32 and the core-side mold 34.

As shown in FIG. 1, the in-mold foil feeding mechanism 40 is provided with a foil sender 41 for feeding the in-mold foil H and a foil winding machine 42 for winding the base film B which is made by separating the transfer foil F from the in-mold foil H. The in-mold foil H is positioned in the neighborhood of the cavity-side mold 32 and the interval between the in-mold foil H and the cavity-side mold 32 when both the molds 32 and 34 are opened is about 2 to 3 mm.

As shown in FIG. 2, the charger 50 is provided with a bottomed cylindrical charger body 51, a tungsten wire 52 arranged inside the charger body 51, a high-voltage DC power source 53 connected to one end of the tungsten wire 52, a ground wire 54 connected to the other end of the tungsten wire 52, a plate electrode 55 arranged opposite to the charger body 51 across the in-mold foil H, a ground wire 56 connected to the plate electrode 55, and a thin plate insulator 57 arranged in the neighborhood of the plate electrode 55 on the side of the charger body 51. The insulator 57 is made of resin or paper.

As shown in FIG. 3, the in-mold foil H has a thickness of about 40 μm to 50 μm, and is provided with the base film B made of PET resin and the transfer foils F arranged at fixed intervals in the winding direction of the base film B. On the base film B, a length detection mark Ba and width detection marks Bb for detecting the position of the in-mold foil H are formed and structured so as to put a pattern part E, which will be described later, in a predetermined position of the cavity-side mold 32.

As shown in FIG. 4, on the transfer foil F, a separation layer K for simplifying separation after forming and an adherent layer S to be adhered to a formed article are laminated from the side of the base film B, and the pattern layer E is formed inside the adherent layer S.

Further, as shown in FIG. 5, transfer foil F in which the separation layer K, a deposited primer layer J, and the adherent layer S are laminated from the side of the base film B, the pattern layer E is formed inside the deposited primer layer J, and a deposited layer T is formed inside the adherent layer S can be used.

In the in-mold forming apparatus 20 structured like this, an in-mold formed article R, for example, an external frame of a portable telephone is formed as indicated below.

Firstly, as shown in FIG. 7, between the cavity-side mold 32 and the core-side mold 34, the in-mold foil H is sent by the foil sender 41, and on the basis of the length detection mark Ba and width detection mark Bb, and the in-mold foil H is positioned and fixed at a predetermined position of the cavity-side mold 32.

Next, as shown in FIG. 8, the cavity-side mold 32 and core-side mold 34 are closed and fused resin Q is injected by the injection molder 35. Next, as shown in FIG. 9, the cavity-side mold 32 and the core-side mold 34 are opened, and the cooled and hardened in-mold formed article R to which the transfer foil F has been transferred is taken out. At this time, fine foil dusts P with a length of several microns to several mm are separated and fallen from the transfer foil F and are scattered around the cavity-side mold 32 and core-side mold 34.

On the other hand, as shown in FIGS. 2 and 6, in the charger 50, a high voltage of −11 kV is applied to the tungsten wire 52. Here, the effect of collecting the foil dusts P is surely obtained with the charging by a high voltage of −11 kV or less or +11 kV or more (that is the absolute value of the high voltage is 11 kV or more). But in some cases, the effect may be obtained with the charging by a high voltage the absolute value of which is 11 kV or less. Negative ions M freed around the tungsten wire 52 by the glow discharge V charge negatively the in-mold foil H and its circumference. At this time, the foil dusts P scattered around are also charged negatively. Further, on the side of a surface 55a of the plate electrode 55, the insulator 57 is formed, so that the foil dusts P charged negatively move toward a rear face 55b charged positively by the potential difference of the plate electrode 55, and are collected and adsorbed. Further, since the insulator 57 is installed, it is prevented that the in-mold foil H is charged and adsorbed by the surface 55a of the plate electrode 55, and thus the winding of the base film B is stopped.

According to the in-mold forming apparatus 20 according to the first embodiment, the foil dusts P are collected by the charger 50, so that an occurrence of defective articles due to the adhesion of the foil dusts P to the cavity-side mold 32 and core-side mold 34 can be minimized. Therefore, the in-mold formed articles R can be manufactured at a high yield rate. Therefore, portable telephones, mobile information terminal devices, and note-type personal computers can be manufactured in good quality at a low cost.

In the embodiment aforementioned, the resin-made frame of a portable telephone is explained by referring to the in-mold forming example. However, the present invention can be applied to any parts of note-type personal computers, portable telephones, mobile information terminal devices, household electric appliances, and car parts and so on.

Second Embodiment

Figure 10:
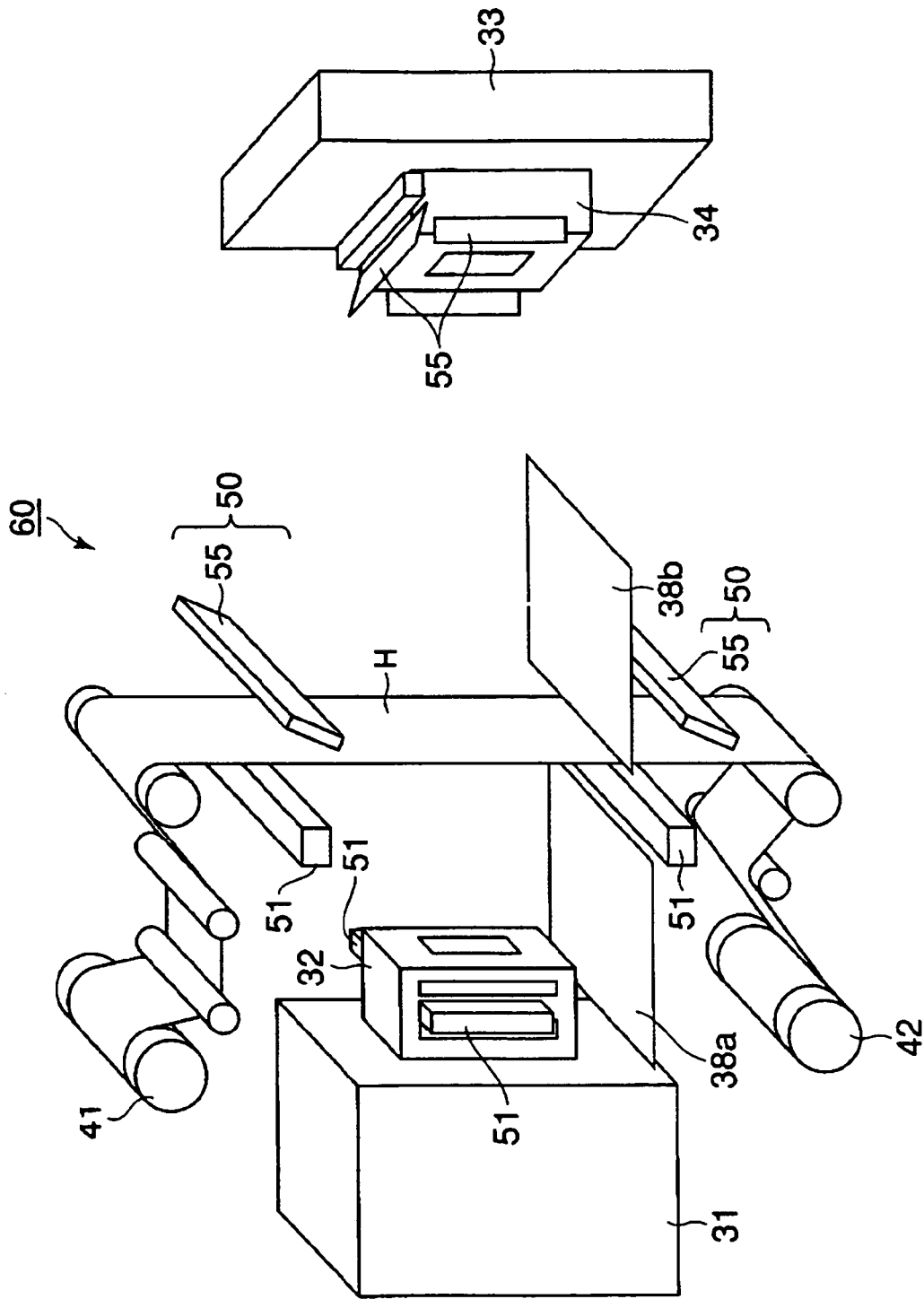
FIG. 10 is a perspective view showing an in-mold forming apparatus according to a second embodiment of the present invention.

FIG. 10 is a perspective view schematically showing an in-mold forming apparatus 60 according to a second embodiment of the present invention. In FIG. 10, to the same functional parts as those shown in FIG. 2, the same numerals are assigned, and the detailed explanation thereof will be omitted.

In the in-mold forming apparatus 20 according to the first embodiment aforementioned, the charger 50 is installed only on the side of the foil winding machine 42 viewed from the cavity-side mold 32 and core-side mold 34. However, in the in-mold forming apparatus 60 according to this embodiment, the chargers 50 are additionally installed on the side of the foil sender 41 and on the cavity-side mold 32 and core-side mold 34. Further, the charger body 51 and the plate electrode 55 are installed in the symmetrical positions with respect to the in-mold foil H.

Also in the in-mold forming apparatus 60 structured like this, the same effects as those of the in-mold forming apparatus 20 aforementioned can be obtained.

Third Embodiment

Figure 11:
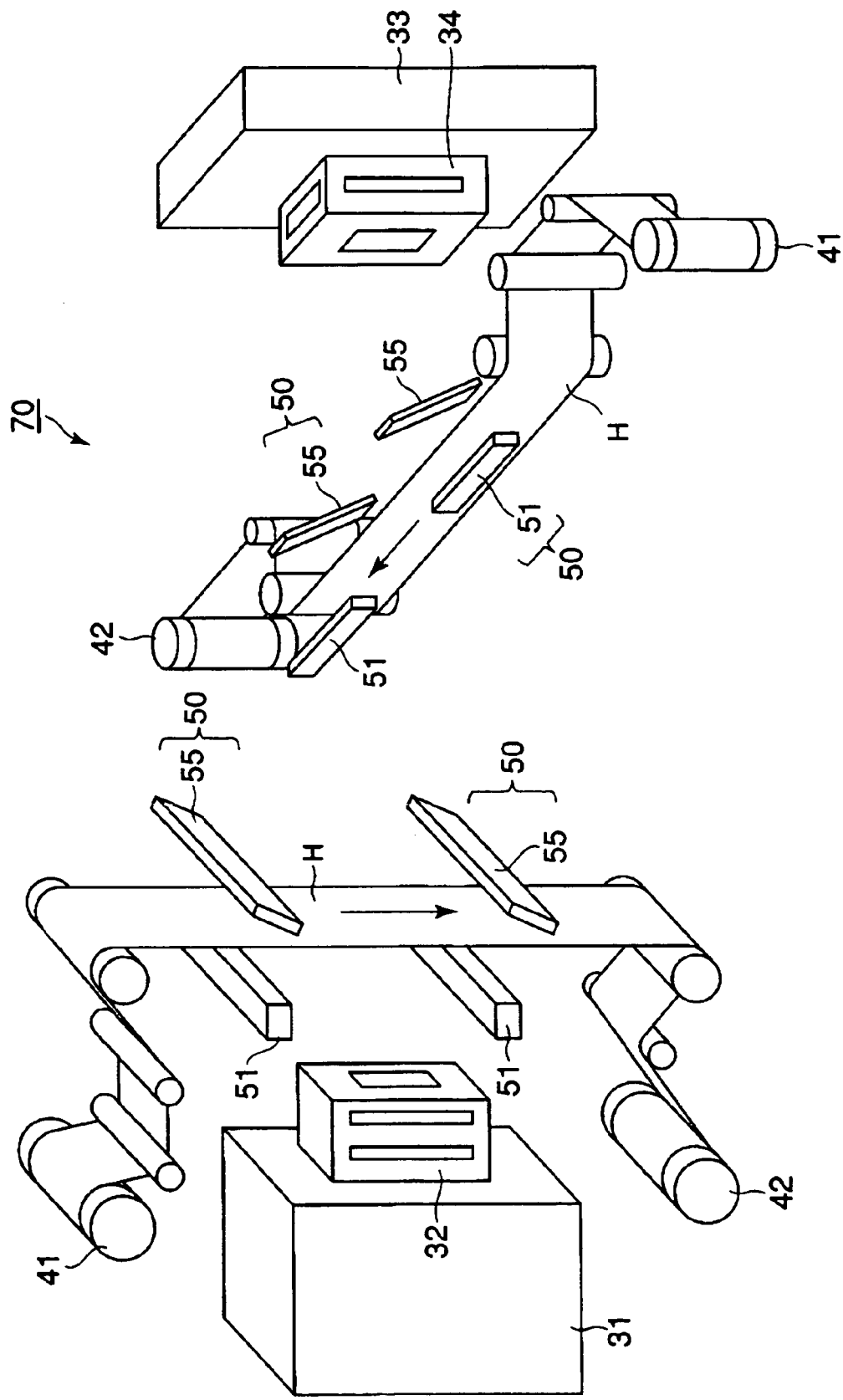
FIG. 11 is a perspective view showing an in-mold forming apparatus according to a third embodiment of the present invention.

FIG. 11 is a perspective view schematically showing an in-mold forming apparatus 70 according to a third embodiment of the present invention. In FIG. 11, to the same functional parts as those shown in FIGS. 2 and 10, the same numerals are assigned and the detailed explanation thereof will be omitted.

In the in-mold forming apparatus 20 according to the first embodiment aforementioned and the in-mold forming apparatus 60 according to the second embodiment aforementioned, the in-mold foil feeding mechanism 40 is installed only in the vertical direction. However, in the in-mold forming apparatus 70 according to this embodiment, the in-mold foil feeding mechanisms 40 are arranged in the vertical and horizontal directions one by one. Therefore, in the in-mold forming apparatus 70, composite in-mold forming in which the in-mold foils H are arranged in the vertical direction and horizontal direction can be executed.

Further, the chargers 50 are installed in the positions corresponding to the cavity-side mold 32 and core-side mold 34 in each of the in-mold foil feeding mechanisms 40 respectively on the sides of the foil sender 41 and the foil winding machine 42, that is, four chargers 50 in total are arranged. Further, the charger bodies 51 and the plate electrodes 55 are installed in the symmetrical positions with respect to the in-mold foils H, respectively.

Also in the in-mold forming apparatus 70 structured like this, the same effects as those of the in-mold forming apparatus 20 aforementioned can be obtained.

Fourth Embodiment

Figure 12:
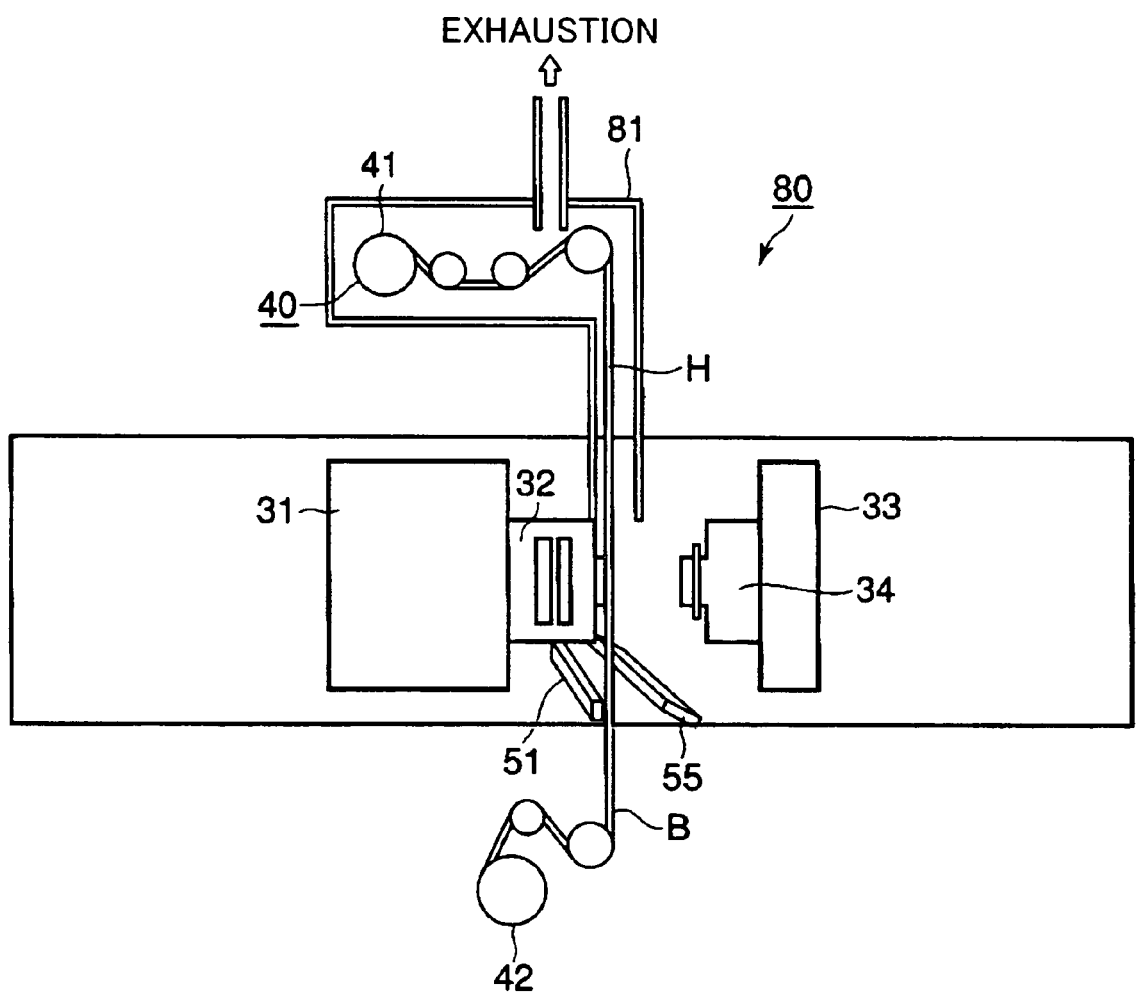
FIG. 12 is a schematic view showing an in-mold forming apparatus according to a fourth embodiment of the present invention.

FIG. 12 is a perspective view schematically showing an in-mold forming apparatus 80 according to a fourth embodiment of the present invention. In FIG. 12, to the same functional parts as those shown in FIG. 2, the same numerals are assigned and the detailed explanation thereof will be omitted.

As shown in FIG. 12, in this embodiment, the foil sender 41 is surrounded by a dustproof cover 81. When air is exhausted from the inside of the dustproof cover 81, the foil dusts P entering into the dustproof cover 81 can be removed.

Also in the in-mold forming apparatus 80 structured like this, the same effects as those of the in-mold forming apparatus 20 aforementioned can be obtained.

Fifth Embodiment

Figure 13:
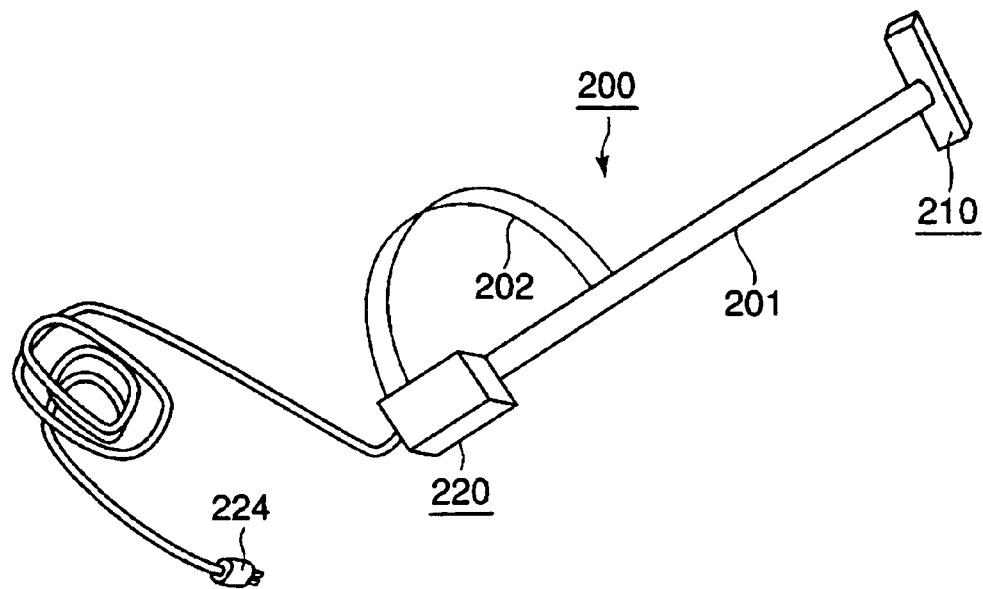
FIG. 13 is a perspective view showing a dust collector according to a fifth embodiment of the present invention.
Figure 14:
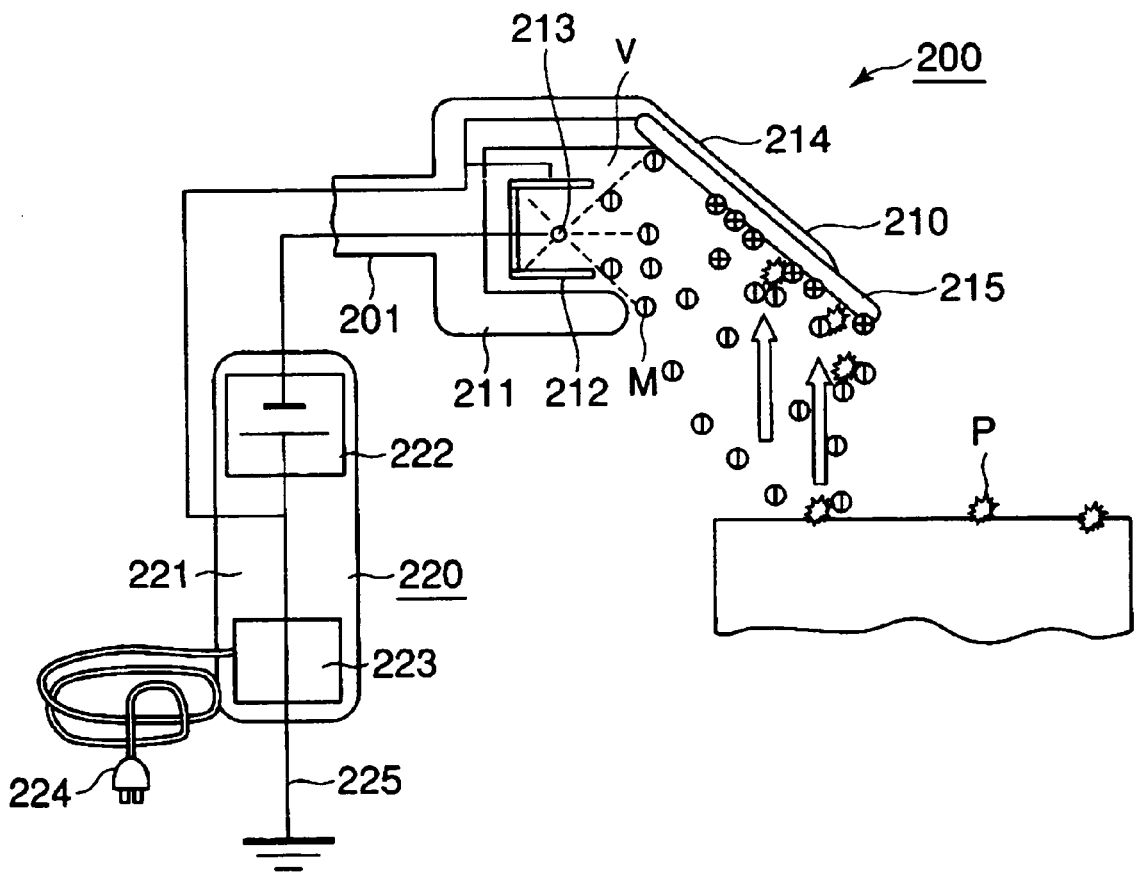
FIG. 14 is an illustration showing an operation principle of the dust collector shown in FIG. 13.
Figure 15:
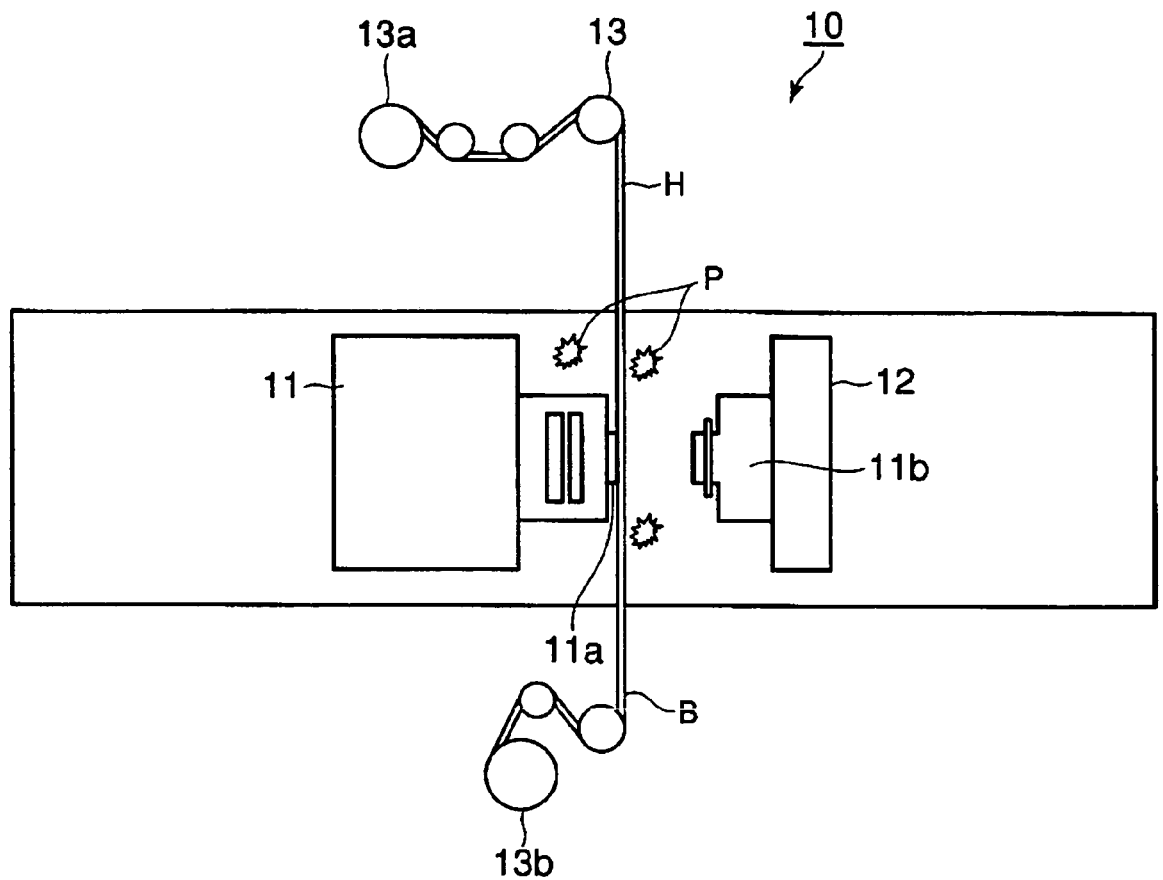
FIG. 15 is a schematic view showing an example of a general in-mold forming apparatus.

FIG. 13 is a perspective view showing a dust collector 200 according to a fifth embodiment of the present invention, and FIG. 14 is an illustration showing an operation principle of the dust collector 200.

The dust collector 200 is provided with an arm 201 and a shoulder belt 202. At the front end of the arm 201, a discharge dust collector unit 210 is installed, and at the base end thereof, a power unit 220 is installed.

On the discharge dust collector unit 210, as shown in FIG. 14, a charger guide 211 and a bottomed cylindrical charger body 212 held by the charger guide 211 are installed. Inside the charger body 212, a charging electrode 213 is installed. At the opposite position of the charger body 212, a metallic electrode 215 held by an electrode guide 214 is installed.

The power unit 220 is provided with a frame 221, a high-voltage power source 222 of 11 kV stored in the frame 221 having a negative electrode connected to the charging electrode 213 and a positive electrode connected to the metallic electrode 215, a DC power source 223 of 24 V, and a grounded 100-V plug 224 connected to the DC power source 223. The metallic electrode 215 is ensured with grounding by the grounded 100-V plug 224. Numeral 225 shown in FIG. 14 indicates a ground wire. Here, the effect of collecting the dusts is surely obtained with the charging by a high voltage of −11 kV or less or +11 kV or more (that is the absolute value of the high voltage is 11 kV or more). But in some cases, the effect may be obtained with the charging by a high voltage the absolute value of which is 11 kV or less.

According to the dust collector 200 structured like this, negative ions M freed from the charger body 212 charge negatively the surfaces of the objects and particles P in the air, and thus the particles P are collected by the metallic electrode 215 due to the potential difference. Further, the dust collector 200 can be moved, so that it charges various kinds of dust and collects the dusts by the metallic electrode 214 at an optional place while moving like a vacuum cleaner.

As described above, by the dust collector 200 according to the fifth embodiment, various kinds of particles can be collected easily and surely.

In addition to the embodiments aforementioned, any embodiments having the same operation as in these embodiments aforementioned belong to the present invention, even if the forming methods and the materials, structures, voltages, currents, distances, and dimensions of the chargers are different. Further, in these embodiments, the negative DC charging is described, though the same effect may be obtained with the positive charging or the AC charging.

Obviously, numerous modifications and variations of the present invention are possible in light of the above teachings. It is therefore to be understood that within the scope of the appended claims, the invention may be practiced otherwise than as specifically described herein.

What is claimed is:

1. An in-mold forming apparatus, comprising:
   an injection molding unit comprising a first mold and a second mold for injection molding;
   a film feeding mechanism for feeding in-mold foil between said first mold and said second mold;
   a transfer foil being formed on said in-mold foil;
   a mold closing mechanism for closing said first mold and said second mold, thereby to fix said in-mold foil inside a cavity formed between said first mold and said second mold;
   a resin injection forming mechanism for injecting fused resin into said cavity, thereby to unite said transfer foil formed on said in-mold foil with said resin; and
   a charger arranged in the neighborhood of at least one of said first mold, said second mold, and said in-mold foil;
   said charger including a charging unit for freeing ions by applying to a charging element capable of charging particles in the neighborhood of said in-mold foil upon application of a sufficiently high voltage, said charger configured to apply said sufficiently high voltage to said charging element to charge particles in the neighborhood of said in-mold foil,
   and a plate electrode having a front surface and a rear face, said rear face being charged positively for adsorbing said particles charged by said ions;
   wherein said particles are foil dusts separated from said in-mold foil, said charging unit and said plate electrode are arranged opposite to each other across said in-mold foil, and said plate electrode includes an insulator arranged on to cover said front surface of said electrode opposite to said charging unit, and
   wherein said charging unit faces one surface of said in-mold foil, said insulator has a first surface facing an opposite surface of said in-mold foil and a second surface opposite said first surface facing said front face of said plate electrode.

2. The in-mold forming apparatus according to claim 1, wherein:
   said charging unit includes a high-voltage DC power source and a glow discharger connected to said high-voltage DC power source.

3. The in-mold forming apparatus according to claim 1, wherein said film feeding mechanism includes:
   a foil sender for feeding said in-mold foil; and
   a foil winding machine for winding a base film made by separating said transfer foil from said in-mold foil.

4. The in-mold forming apparatus according to claim 3, wherein:
   said charger includes a first charger and a second charger arranged in the neighborhood of said first mold and said second mold;
   said first charger is arranged on a side of said foil sender; and
   said second charger is arranged on a side of said foil winding machine.

5. The in-mold forming apparatus according to claim 3, wherein:
   said foil sender further includes a dustproof cover for surrounding said foil sender to remove a particle entering into said dustproof cover.

6. The in-mold forming apparatus according to claim 1, wherein the charging element includes a tungsten wire.

* * * * *